Figure 1:
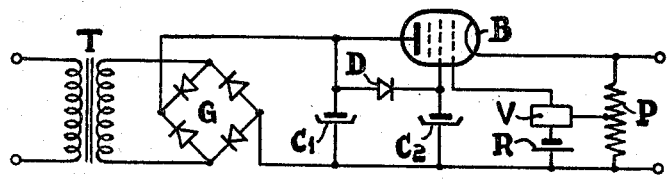

INVENTOR
BERNARDUS H. J. CORNELISSEN

United States Patent Office 3,112,436
Patented Nov. 26, 1963

3,112,436
DIRECT-VOLTAGE STABILIZING DEVICE
Bernardus Henricus Jozef Cornelissen, Eindhoven, Netherlands, assignor to North American Philips Company, Inc., New York, N.Y., a corporation of Delaware
Filed Nov. 10, 1960, Ser. No. 68,501
Claims priority, application Netherlands Dec. 15, 1959
3 Claims. (Cl. 323—22)

The invention relates to a device for the stabilization of a direct voltage obtained from an alternating-voltage mains by rectification, the rectified current passing through a control-valve formed by a pentode and controlled by a voltage derived from the direct voltage.

With such devices the control is effected by comparing part of the direct voltage with a reference voltage and by supplying the amplified difference to the control-grid of the control-valve in a phase such that any variation in the direct voltage is checked.

In order to reduce the ripple voltage usually a choke is connected between the rectifier and the anode of the control-valve and the anode is, moreover, connected via a capacitor of high capacity to a point of constant voltage.

The object of the invention is to provide such a device that a suppression of the ripple voltage is obtained by simple means.

In accordance with the invention at least the screen-grid of the control-valve is connected via a smoothing capacitor to a point of constant voltage, whilst between the positive conductor of the rectifier to the anode and the screen-grid a rectifier is connected so that the anode voltage can drop below that of the screen-grid.

The invention is based on the phenomenon that the influence of the anode voltage on the output voltage is considerably smaller than that of the screen-grid voltage.

The invention will be described more fully with reference to the drawing.

Figure 2:
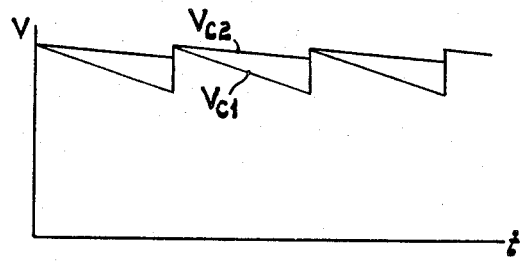
Figure 3:
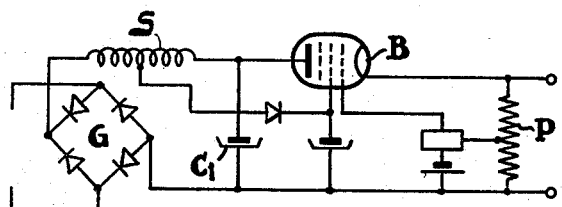
Figure 4:
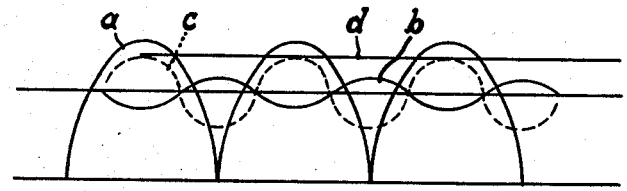

FIG. 1 shows the circuit arrangement of a first embodiment and
FIG. 2 shows an explanatory graph;
FIG. 3 shows a second embodiment and
FIG. 4 shows a graph.

The device is connected via a transformer T to a rectifier G with four rectifying elements. One output terminal thereof is connected to a point of constant potential and the other terminal is connected to the anode of the control-valve B, of which the cathode is connected to the positive output terminal of the device. Between the anode and the point of constant potential is connected an electrolytic capacitor C1 and between the screen-grid and the said point is connected the electrolytic capacitor C2. Across the output terminals is connected a potentiometer P, of which a tapping is connected to an input terminal of the amplifier B. R designates a reference-voltage source included between the cathode and and the amplifying valve V and earth.

The device described above stabilizes in known manner the voltage at the output terminal, irrespective of fluctuations of the rectifier voltage and of the load connected to the output terminals.

Between the anode and the screen-grid is included a diode D, which ensures that the screen-grid voltage cannot drop below the anode voltage.

FIG. 2 shows the variation of the anode voltage and of the screen-grid voltage with respect to the cathode voltage as a function of time. It is assumed that the anode voltage, after the capacitor C1 has been charged, drops to a given value, after the discharge of this capacitor, which is subsequently recharged. This variation is designated by VC1. The variation of the voltage VC2 at the screen-grid is considerably more uniform owing to the fact that the screen-grid current is only a small part of the anode current so that the capacitor C2 is discharged less rapidly. Owing thereto an inductor in the anode supply lead may be dispensed with at the same ripple voltage.

It is a further advantage that the screen-grid voltage is equal to the peak value of the rectified voltage.

FIG. 3 shows an embodiment of the device according to the invention for higher currents, for example, higher than 1A, in which, as a rule, an input filter with a choke S and a parallel capacitor C are required. The screen-grid is connected via the rectifier to a tapping of the choke.

With a minimum mains voltage the anode voltage is chosen as low as is permitted by the characteristic curve. It is in this case required for the screen-grid voltage to be sufficiently high. With the arrangement shown in FIG. 3 this is achieved in a simple manner.

In FIG. 4 $a$ designates the rectified voltage, $b$ the voltage at the anode and $c$ the voltage at the tapping. The screen-grid voltage $d$ corresponds substantially to the peak value of the voltage at the tapping.

What is claimed is:

1. A voltage regulator comprising an input terminal, an output terminal, a point of reference potential, an electron discharge device having at least a cathode, a control grid, a screen grid, and an anode, means connecting said anode to said input terminal, means connecting said cathode to said output terminal, capacitor means connected between said screen grid and said point, rectifier means having an anode and a cathode, means connecting said cathode of said rectifier means to said screen grid, means connecting the anode of said rectifier means to said means connecting said anode of said discharge device to said input terminal whereby the potential of the anode of said discharge device may fall below the potential of said screen grid, and means connected between said output terminal and control grid for varying the potential of said control grid as a function of the voltage of said output terminal.

2. A voltage regulator circuit comprising an input terminal, an output terminal, a point of reference potential, an electron discharge device having at least a cathode, a control grid, a screen grid, and an anode, means connecting said anode to said input terminal, means connecting said cathode to said output terminal, a first capacitor connected between said anode and said point of reference potential, a second capacitor connected between said screen grid and said point, rectifier means connected between said anode and screen grid, said rectifier having a polarity permitting the voltage of said anode to fall below the voltage of said screen grid, and means connected between said control grid and output terminal for varying the voltage on said control grid as a function of the voltage at said output terminal.

3. A voltage regulator comprising an input terminal, an output terminal, a point of reference potential, an electron discharge device having at least a cathode, a control grid, a screen grid, and an anode, an inductor having a tap, means connecting said inductor between said anode and said input terminal, means connecting said cathode to said output terminal, a first capacitor connected between said anode and said point, a second capacitor connected between said screen grid and said point, rectifier means having a cathode and an anode, means connecting the cathode of said rectifier means to said screen grid, means connecting the anode of said rectifier means to said tap, and means connected between said output terminal and said control grid for varying the potential of said control grid as a function of the voltage of said output terminal.

References Cited in the file of this patent

UNITED STATES PATENTS

| | | |
|---|---|---|
| 2,693,565 | Edwards | Nov. 2, 1954 |
| 2,867,764 | Harrison | Jan. 6, 1959 |
| 2,995,246 | Reaves | Oct. 4, 1960 |
| 2,957,119 | Carlson | Oct. 18, 1960 |